US011089505B2

(12) United States Patent
Liu et al.

(10) Patent No.: US 11,089,505 B2
(45) Date of Patent: Aug. 10, 2021

(54) METHOD AND DEVICE FOR TRANSMITTING DATA BASED ON QUALITY OF SERVICE

(71) Applicant: GUANGDONG OPPO MOBILE TELECOMMUNICATIONS CORP., LTD., Guangdong (CN)

(72) Inventors: Jianhua Liu, Dongguan (CN); Cong Shi, Dongguan (CN); Xin You, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 235 days.

(21) Appl. No.: 16/347,002

(22) PCT Filed: Feb. 9, 2018

(86) PCT No.: PCT/CN2018/076057
§ 371 (c)(1),
(2) Date: May 2, 2019

(87) PCT Pub. No.: WO2019/153272
PCT Pub. Date: Aug. 15, 2019

(65) Prior Publication Data
US 2021/0105654 A1   Apr. 8, 2021

(51) Int. Cl.
*H04W 28/02* (2009.01)
*H04W 28/10* (2009.01)
(Continued)

(52) U.S. Cl.
CPC ....... *H04W 28/0268* (2013.01); *H04W 28/10* (2013.01); *H04W 72/087* (2013.01); *H04W 84/042* (2013.01)

(58) Field of Classification Search
None
See application file for complete search history.

(56) References Cited

U.S. PATENT DOCUMENTS 8,792,439 B2   7/2014 Kahn
8,792,471 B2   7/2014 Kim
(Continued)

FOREIGN PATENT DOCUMENTS

CN   101052198 A   10/2007
CN   101272600 A   9/2008
(Continued)

OTHER PUBLICATIONS

3GPP TS 23.501 V0.4.0 (Apr. 2017). "System Architecture for the 5G System", Stage 2 (Release 15).
(Continued)

*Primary Examiner* — Ajit Patel
(74) *Attorney, Agent, or Firm* — Ladas & Parry, LLP

(57) ABSTRACT

Disclosed are a method for transmitting data based on QoS, a network device and a terminal device. The method includes: determining, by the network device according to an attribute of a QoS flow, a QoS rule used by the terminal device for transmitting an uplink data packet; sending indication information to the terminal device, the indication information being for indicating the QoS rule. The network device determines the QoS rule used by the terminal device for transmitting the uplink data packet according to the attribute of the QoS flow. Number of bits occupied by a QFI in different QoS rules is different, so that the terminal device can correctly acquire the QFI based on the used QoS rule and acquires a mapping from application layer data to the QoS flow according to a QFI carried in a downlink data packet, thereby filtering and sending the data packet to be transmitted.

11 Claims, 4 Drawing Sheets

(51) Int. Cl.
*H04W 72/08* (2009.01)
*H04W 84/04* (2009.01)

(56) References Cited

U.S. PATENT DOCUMENTS

| | | | |
|---|---|---|---|
| 10,911,977 B2* | 2/2021 | Agiwal | ................ H04W 76/12 |
| 2011/0032834 A1 | 2/2011 | Kim | |
| 2013/0089033 A1 | 4/2013 | Kahn | |
| 2017/0359749 A1* | 12/2017 | Dao | ................ H04W 28/0268 |
| 2019/0069199 A1* | 2/2019 | Yan | ................ H04W 28/0268 |
| 2019/0349804 A1* | 11/2019 | Cho | ................ H04W 28/0263 |
| 2019/0357075 A1* | 11/2019 | Van Der Velde | ........................... H04W 28/0268 |
| 2019/0357119 A1* | 11/2019 | Hong | ................ H04W 48/08 |
| 2020/0128430 A1* | 4/2020 | Yi | ................ H04W 28/0268 |
| 2020/0178048 A1* | 6/2020 | Kim | ................ H04W 4/40 |
| 2020/0275302 A1* | 8/2020 | Youn | ................ H04W 28/0268 |
| 2020/0404533 A1* | 12/2020 | Nilsson | ................ H04W 12/033 |

FOREIGN PATENT DOCUMENTS

| | | |
|---|---|---|
| CN | 103999504 A | 8/2014 |
| CN | 109981488 A | 7/2019 |

OTHER PUBLICATIONS

3GPP TS 23.401 V13.5.0 (Dec. 2015), "GPRS enhancements for Evolved Universal Terrestrial Radio Access Network", (E-UTRAN) access (Release 13).
Third Office Action of the European application No. 18852703.0, dated Dec. 1, 2020.
Third Office Action of the Chinese application No. 201880003770.8, dated Jul. 7, 2020.
Second Office Action of the European application No. 18852703.0, dated Jul. 9, 2020.
Written Opinion of the International Search Authority in the international application No. PCT/CN2018/076057, dated Oct. 29, 2018.
Mediatek Inc:"Some considerations on SDAP header design", 3GPP Draft; R2-1801151 Some Considerations on SDAP Header, 3rd Generation Partnership Project (3GPP), Mobile Competence Centre; 650, Route Des Lucioles ; F-06921 Sophia-Antipolis Cedex ; France, vol. RAN WG2, no. Vancouver, Canada; Jan. 22, 2018-Jan. 26, 2018 Jan. 12, 2018 (Jan. 12, 2018) , XP051386616.
Huawei et al: "Further discussion on SDAP Header Format", 3GPP Draft; R2-1800262-SDAP Header Format-V1, 3rd Generation Partnership Project (3GPP) ,Mobile Competence Centre; 650, Route Des Lucioles ; F-06921 Sophia-Antipolis Cedex ; France, vol. RAN WG2, no. Vancouver, Canada; Jan. 22, 2018-Jan. 26, 2018 Jan. 12, 2018 (Jan. 12, 2018), XP051386111.
Ericsson:"Analysis of the QoS Framework (Stage 2)", 3GPP Draft; R2-1800694—Analysis of the QOS Framework (Stage 2), 3rd Generation Partnership Project (3GPP), Mobi Le Competence Centre ; 650, Route Des Lucioles ; F-06921 Sophia-Antipolis Cedex; Franc vol. RAN WG2, no. Vancouver, Canada; Jan. 22, 2018-Jan. 26, 2018 Jan. 11, 2018 (Jan. 11, 2018), XP051385812.
Huawei et al:"TS23.501: Clarification for the default QoS flow, notification control and 5QI", 3GPP Draft; S2-175610 TS23 501 Clarification for the Default QOS Flow Notification Control and 5QI V2, 3rd Generation Partnership Project (3GPP), Mobile Competence Centre ; 650, Route Des Lucioles ; F, vol. SA WG2, no. Sophia Antipolis, France; Aug. 21, 2017-Aug. 25, 2017 Aug. 15, 2017(Aug. 15, 2017), XP051335085.
ITRI : Discussion on SDAP header format , 3GPP Draft; R2-1709084_Discussion on Soap Header Format, 3rd Generation Partnership Project (3GPP ), Mobile Competence Centre; 650, Route Des Lucioles ; F-06921 Sophia-Antipolis Cedex ; France vol. RAN WG2, no. Berlin, Germany; Aug. 21, 2017-Aug. 25, 2017 Aug. 20, 2017 (Aug. 20, 2017), XP051318876.
International Search Report in the international application No. PCT/CN2018/076057, dated Oct. 29, 2018.
Supplementary European Search Report in the European application No. 18852703.0, dated Aug. 27, 2019.
Second Office Action of the Chinese application No. 201880003770.8, dated Mar. 20, 2020.
First Office Action of the Chinese application No. 201880003770.8, dated Dec. 18, 2019.
First Office Action of the European application No. 18852703.0, dated Mar. 3, 2020.
International Search Report in international application No. PCT/CN2018/076057, dated Oct. 29, 2018 and its English translation provided by Google translate.
Written Opinion Opinion of the International Search Authority in international application No. PCT/CN2018/076057, dated Oct. 29, 2018 and its English translation provided by Google translate.
Oral Review of the European application No. 18852703.0, dated May 17, 2021.

* cited by examiner

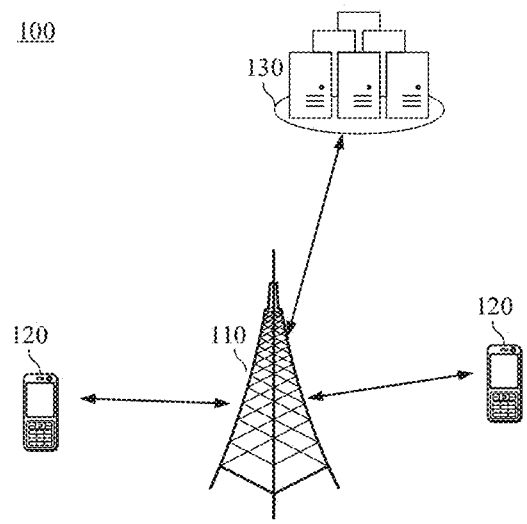

```
┌─────────────────────────────────────────┐
│ A network device determines, according  │──210
│ to an attribute of a QoS flow, a QoS    │
│ rule used by a terminal device for      │
│ transmitting an uplink data packet      │
└─────────────────────────────────────────┘
                    │
                    ▼
┌─────────────────────────────────────────┐
│ The network device sends indication     │──220
│ information to the terminal device,     │
│ wherein the indication information is   │
│ used for indicating the QoS rule        │
└─────────────────────────────────────────┘
```

FIG. 2

METHOD AND DEVICE FOR TRANSMITTING DATA BASED ON QUALITY OF SERVICE

CROSS-REFERENCE TO RELATED APPLICATION

The present application is the U.S. national phase application of PCT Application No. PCT/CN2018/076057 filed on Feb. 9, 2018, the disclosure of which is incorporated herein in its entirety by reference.

TECHNICAL FIELD

The disclosure relates to the field of communication, and in particular to a method and device for transmitting data based on Quality of Service (QoS).

BACKGROUND

In a 5th Generation (5G) system or a New Radio (NR) system, different QoS flows are identified by different QoS flow Identifiers (QFIs). A maximum value of a 5G Quality of Service Identifier (5QI) is 79 and a QFI may be dynamically allocated or implicitly equal to 5QI, and thus the QFI is indicated by at least 7 bits. When a QFI at an access network side only support a 6-bit QFI, a terminal device cannot acquire a correct QFI and determine a mapping from application layer data to QoS flows.

SUMMARY

The disclosure provide a method and device for transmitting data based on QoS, which enables a terminal device to correctly acquire the mapping from application layer data to QoS flows.

According to a first aspect, the disclosure provides a method for transmitting data based on QoS, which may include the following operations. A network device determines, according to an attribute of a QoS flow, a QoS rule used by a terminal device for transmitting an uplink data packet. The network device sends indication information to the terminal device, wherein the indication information is used for indicating the QoS rule.

Therefore, the network device determines, according to the attribute of the QoS flow, the QoS rule used by the terminal device for transmitting the uplink data packet. The number of bits occupied by a QFI in different QoS rules is different, so that the terminal device can correctly acquire a QFI based on the used QoS rule, and acquire a mapping from application layer data to the QoS flow according to a QFI carried in a downlink data packet, thereby filtering and sending a data packet to be transmitted.

In a possible implementation manner, the QoS rule includes a first QoS rale or a second QoS rule. The first QoS rule is a rule that the terminal device determines, according to a QFI of a QoS flow including a downlink data packet, a mapping between application layer data and the QoS flow and transmits the uplink data packet based on the mapping, wherein the QFI is carried in the downlink data packet. The second QoS rule is a rule that the terminal device transmits the uplink data packet based on the mapping configured by the network device.

In a possible implementation manner, the attribute of the QoS flow includes a value of the QFI.

In a possible implementation manner, the operation that the network device determines, according to the attribute of the QoS flow, the QoS rule used by the terminal device may include the following action. Responsive to determining that the value of the QFI is less than or equal to K, the network device determines that the QoS rule is the first QoS rule. Responsive to determining that the value of the QFI is greater than K, the network device determines that the QoS rule is the second QoS rule. $K=2^M-1$, M is the number of bits occupied by the QFI When the first QoS rule is used, and K and M both are a positive integer.

In a possible implementation manner, the attribute of the QoS flow includes QoS information of the QoS flow. The QoS information includes at least one of the following: a resource type of the QoS flow, a priority level of the QoS flow, a packet delay budget of the QoS flow, a packet error rate of the QoS flow, an averaging window of the QoS flow or a maximum data burst volume of the QoS flow.

In a possible implementation manner, the QoS information includes the resource type of the QoS flow. The operation that the network device determines, according to the attribute of the QoS flow, the QoS rule used by the terminal device may include the following action. Responsive to determining that the resource type of the QoS flow is a Guaranteed Bit Rate (GBR) type or a delay critical GBR type, the network device determines that the QoS rule is the first QoS rule. Responsive to determining that the resource type of the QoS flow is a non-GBR type, the network device determines that the QoS rule is the second QoS rule.

In a possible implementation manner, the method may further include the following operation. The network device determines the number of bits occupied by the QFI according to the QoS rule.

In a possible implementation manner, the operation that the network device determines the number of bits occupied by the QFI according to the QoS rule may include the following action. Responsive to determining that the QoS rule is the first QoS rule, the network device determines that the number of bits occupied by the QFI is M. Responsive to determining that the QoS rule is the second QoS rule, the network device determines that the number of bits occupied by the QFI is N. M and N both are a positive integer, and M≠N.

In a possible implementation manner, M=6, N=7.

In a possible implementation manner, the network device is an access network device or a core network device.

In a possible implementation manner, when the network device is the access network device, the method may further include the following operation. The access network device receives information of the attribute of the QoS flow from a core network device, other access network devices or the terminal device.

According to a second aspect, the disclosure provides a method for transmitting data based on QoS, which may include the following operations. A network device determines, according to a QoS rule used by a terminal device, the number of bits occupied by a QFI for identifying a QoS flow.

Therefore, the network device determines, according to the QoS rule used by the terminal device, the number of bits occupied by the QFI. The number of bits occupied by a QFI in different QoS rules is different, so that the terminal device can correctly acquire a QFI based on the used QoS rule, and acquire a mapping from application layer data to the QoS flow according to a QFI carried in a downlink data packet, thereby filtering and sending a data packet to be transmitted.

In a possible implementation manner, the QoS rule includes a first QoS rule or a second QoS rule. The first QoS rule is a rule that the terminal device determines, according to a QFI of a QoS flow including a the downlink data packet, a mapping between application layer data and the QoS flow and transmits the uplink data packet based on the mapping, wherein the QFI is carried in the downlink data packet. The second QoS rule is a rule that the terminal device transmits the uplink data packet based on the mapping configured by the network device.

In a possible implementation manner, the operation that the network device determines, according to the QoS rule used by the terminal device, the number of bits occupied by the QFI for identifying the QoS flow may include the following actions. Responsive to determining that the QoS rule is the first QoS rule, the network device determines that the number of bits occupied by the QFI is M. Responsive to determining that the QoS rule is the second QoS rule, the network device determines that the number of bits occupied by the QFI is N. M and N both are a positive integer, and M≠N.

In a possible implementation manner, M=6, N=7.

According to a third aspect, the disclosure provides a method for transmitting data based on QoS, which may include the following operations. A terminal device receives indication information sent by a network device, wherein the indication information is used to indicate a QoS rule for transmitting an uplink data packet. The terminal device sends the uplink data packet to the network device based on the QoS rule.

Therefore, the terminal device determines, according to an indication of the network device, the QoS rule used for transmitting the uplink data packet. The number of bits occupied by a QFI in different QoS rules is different, so that the terminal device can correctly acquire a QFI based on the used QoS rule, and acquire a mapping from application layer data to the QoS flow according to a QFI carried in a downlink data packet, thereby filtering and sending a data packet to be transmitted.

In a possible implementation manner, the QoS rule includes a first QoS rule or a second QoS rule. The first QoS rule is a rule that the terminal device determines, according to a QFI of a QoS flow including a downlink data packet, a mapping between application layer data and the QoS flow and transmits the uplink data packet based on the mapping, wherein the QFI is carried in the downlink data packet. The second QoS rule is a rule that the terminal device transmits the uplink data packet based on the mapping configured by the network device.

In a possible implementation manner, when a value of the QFI is less than or equal to K, the QoS rule is the first QoS rule, and when the value of the QFI is greater than K, the QoS rule is the second QoS rule. $K=2^{M}-1$, M is the number of bits occupied by the QFI when the first QoS rule is used, and K and M both are a positive integer.

In a possible implementation manner, when a resource type of the QoS flow is a GBR type or a delay critical GRB type, the QoS rule is the first QoS, and when the resource type of the QoS flow is a non-GBR type, the QoS rule is the second QoS rule.

In a possible implementation manner, when the QoS rule is the first QoS rule, the number of bits occupied by the QFI is M, and when the QoS rule is the second QoS rule, the number of bits occupied by the QFI is N. M and N both are a positive integer, and M≠N, In a possible implementation manner, M=6, N=7.

In a possible implementation manner, the network device is an access network device or a core network device.

In a possible implementation manner, when the network device is an access network device, the method may further include the following operation. The terminal device sends information of an attribute of the QoS flow to the access network device. The information of the attribute of the QoS flow is used by the network device to determine the QoS rule.

According to a fourth aspect, the disclosure provides a network device. The network device may execute operations of the network device in the first aspect or any optional implementation manner of the first aspect. Specifically, the network device may include modules configured to execute the operations of the network device in the first aspect or any possible implementation manner of the first aspect.

According to a fifth aspect, the disclosure provides a network device. The network device may execute operations of the network device in the second aspect or any optional implementation manner of the second aspect. Specifically, the network device may include a module configured to execute the operations of the network device in the second aspect or any possible implementation manner of the second aspect.

According to a sixth aspect, the disclosure provides a terminal device. The terminal device may execute operations of the terminal device in the third aspect or any optional implementation manner of the third aspect. Specifically, the terminal device may include a module configured to execute the operations of the terminal device in the third aspect or any possible implementation manner of the third aspect.

According to a seventh aspect, the disclosure provides a network device. The network device may include a processor, a transceiver and a memory. The processor, the transceiver and the memory communicate to each other via an internal connection path. The memory is configured to store an instruction. The processor is configured to execute the instruction stored by the memory. When the processor executes the instruction stored by the memory, such execution enables the network device to execute the method in the first aspect or any possible implementation manner of the first aspect, or such execution enables the network device to implement the network device provided in the fourth aspect.

According to an eighth aspect, the disclosure provides a network device. The network device may include a processor, a transceiver and a memory. The processor, the transceiver and the memory communicate to each other via an internal connection path. The memory is configured to store an instruction. The processor is configured to execute the instruction stored by the memory. When the processor executes the instruction stored by the memory, such execution enables the network device to execute the method in the second aspect or any possible implementation manner of the second aspect, or such execution enables the network device to implement the network device provided in the fifth aspect.

According to a ninth aspect, the disclosure provides a network device. The network device may include a processor, a transceiver and a memory. The processor, the transceiver and the memory communicate to each other via an internal connection path. The memory is configured to store an instruction. The processor is configured to execute the instruction stored by the memory. When the processor executes the instruction stored by the memory, such execution enables the network device to execute the method in the third aspect or any possible implementation manner of the third aspect, or such execution enables the network device to implement the network device provided in the sixth aspect.

According to a tenth aspect, the disclosure provides a system chip. The system chip may include an input interface, an output interface, a processor and a memory. The processor is configured to execute an instruction stored by the memory. When the instruction is executed, the processor may implement the method in the first aspect or any possible implementation manner of the first aspect.

According to an eleventh aspect, the disclosure provides a system chip. The system chip may include an input interface, an output interface, a processor and a memory. The processor is configured to execute an instruction stored by the memory. When the instruction is executed, the processor may implement the method in the second aspect or any possible implementation manner of the second aspect.

According to a twelfth aspect, the disclosure provides a system chip. The system chip may include an input interface, an output interface, a processor and a memory. The processor is configured to execute an instruction stored by the memory. When the instruction is executed, the processor may implement the method in the third aspect or any possible implementation manner of the third aspect.

According to a thirteenth aspect, the disclosure provides a computer storage medium. The computer storage medium is configured to store a computer software instruction used for executing the method in the first aspect or any possible implementation manner of the first aspect, or used by the method in the first aspect or any possible implementation manner of the first aspect, and includes a program designed for executing the above aspect.

According to a fourteenth aspect, the disclosure provides a computer storage medium. The computer storage medium is configured to store a computer software instruction used for executing the method in the second aspect or any possible implementation manner of the second aspect, or used by the method in the second aspect or any possible implementation manner of the second aspect, and includes a program designed for executing the above aspect.

According to a fifteenth aspect, the disclosure provides a computer storage medium. The computer storage medium is configured to store a computer software instruction used for executing the method in the third aspect or any possible implementation manner of the third aspect, or used by the method in the third aspect or any possible implementation manner of the third aspect, and includes a program designed for executing the above aspect.

According to a sixteenth aspect, the disclosure provides a computer program product including an instruction. The computer program product, when operated on a computer, may cause the computer to perform the method in the first aspect or any possible implementation manner of the first aspect.

According to a seventeenth aspect, the disclosure provides a computer program product including an instruction. The computer program product, when operated on a computer, may cause the computer to perform the method in the second aspect or any possible implementation manner of the second aspect.

According to an eighteenth aspect, the disclosure provides a computer program product including an instruction. The computer program product, when operated on a computer, may cause the computer to perform the method in the third aspect or any possible implementation manner of the third aspect.

BRIEF DESCRIPTION OF DRAWINGS

FIG. 1 illustrates a schematic diagram of a wireless communication system according to an embodiment of the disclosure.

FIG. 2 illustrates a schematic flowchart of a method for transmitting data based on QoS according to an embodiment of the disclosure.

DETAILED DESCRIPTION

Figure 3:
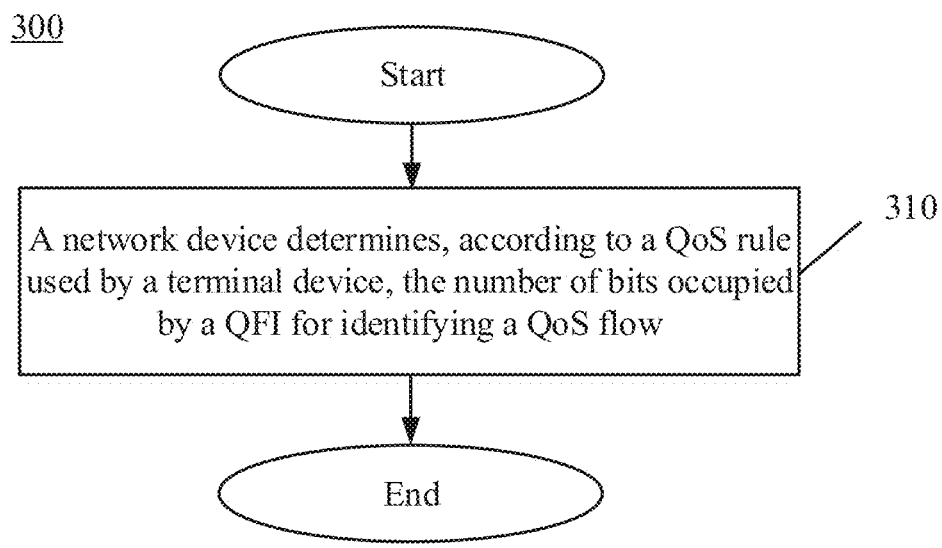
FIG. 3 illustrates a schematic flowchart of a method for transmitting data based on QoS according to an embodiment of the disclosure.

The technical solutions in the embodiments of the disclosure may be applied in various communications systems, such as a Global System of Mobile communication (abbreviated as "GSM") system, a Code Division Multiple Access (abbreviated as "CDMA") system, a Wideband Code Division Multiple Access (abbreviated as "WCDMA") system, a General Packet Radio Service (abbreviated as "GPRS") system, a Long Term Evolution (abbreviated as "LIE") system, an LTE Frequency Division Duplex (abbreviated as "FDD") system, an LTE Time Division Duplex (abbreviated as "TDD") system, a Universal Mobile Telecommunication System (abbreviated as "UMTS") system, a Worldwide Interoperability for Microwave Access (abbreviated as "WiMAX") communication system or a future 5G system, FIG. 1 illustrates a wireless communication system 100 of an application according to an embodiment of the disclosure. The wireless communication system 100 may include a network device 110. The network device 110 may be a device communicating with a terminal device. The network device 110 may provide a communication coverage for a specific geographical area, and may communicate with a terminal device (such as, User Equipment (UE)) in the coverage area. In at least one embodiment, the network device 110 may be a Base Transceiver Station (BTS) in a GSM or CDMA system, may also be a NodeB (NB) in a WCDMA system, may further be an Evolutional NodeB (eNB or eNodeB) in an LTE system, or a wireless controller in a Cloud Radio Access Network (CRAN); or the network device may be a relay station, an access point, a vehicle-mounted device, a wearable device, a network-side device in a future 5G network, a network device in a future evolutional Public Land Mobile Network (PLMN) or the like. The network device may further be an Evolved Universal Terrestrial Radio Access Network (E-UTRAN) or a Next Generation Radio Access Network (NG-RAN).

The network device 110 may be an access network device 110, and the wireless communication system 100 further includes a core network device 130. In at least one embodiment, the core network device 130 may be an Evolved Packet Core (EPC) of an LTE network, and may also be a 5G Core (SGC) such as an Access and Mobility Management Function (AMF) or a Session Management Function (SMF).

The wireless communication system 100 may further include at least one terminal device 120 located within a coverage of the network device 110. The terminal device 120 may be mobile or fixed. In at least one embodiment, the terminal device 120 may be an access terminal, UE, a user unit, a user station, a mobile station, a mobile radio station, a remote station, a remote terminal, a mobile device, a user terminal, a terminal, a wireless communication device, a user agent or a user device. The access terminal may be a cellular phone, a cordless telephone, a Session Initiation Protocol (SIP) phone, a Wireless Local Loop (WLL) station, a Personal Digital Assistant (PDA), a handheld device having a wireless communication function, a computing device or other processing devices connected to a wireless modem, a vehicle-mounted device, a wearable device, a terminal device in a future 5G network or a terminal device in a future evolved PLMN.

FIG. 1 schematically illustrates an access network device, a core network device and two terminal devices. In at least one embodiment, the wireless communication system 100 may include multiple network devices, and a coverage of each network device may include other number of terminal devices, which is not limited in the embodiments of the disclosure.

In at least one embodiment, the wireless communication system 100 may further include other network entities such as a Mobile Management Entity (MME), a Unified Data Management (UDM), an Authentication Server Function (AUSF), a User Plane Function (UPF), a Signaling Gateway (SWG) and the like, which is not limited in the embodiments of the disclosure.

In a 5G system, a Service Data Adaptation Protocol (SDAP) layer is added on an upper layer of a Packet Data. Convergence Protocol (PDCP) layer by the access network-side device, and may be configured to configure a QFI. The QFI is used for identifying a QoS flow.

Different QoS flows may be identified by different QFIs. Since a maximum value of 5QI in the SG network is 79, the QFI at least needs 7 bits. When an air interface of the terminal device only supports a 6-bit QFI, the terminal may not acquire a correct QFI.

According to the embodiments of the disclosure, two QoS rules are provided. A network device determines, according to an attribute of a QoS flow, a QoS rule used by a terminal device for transmitting an uplink data packet. The number of bits occupied by a QFI in different QoS rules is different, so that the terminal device can correctly acquire a QFI based on the used QoS rule and acquire a mapping from application layer data to the QoS flow according to a QFI carried in a downlink data packet, thereby filtering and sending a data packet to be transmitted. Moreover, in at least one embodiment of the disclosure, the number of bits occupied by the QFI in different QoS rules may be determined by the network device according to the different QoS rules.

FIG. 2 illustrates a schematic flowchart of a method 200 for transmitting data based on QoS according to an embodiment of the disclosure. The method 200 illustrated in FIG. 2 may be executed by a network device. The network device may be, for example, the access network device 110 or the core network device 130 illustrated in FIG. 1. As illustrated in FIG. 2, the method 200 may include a part or all of the following contents.

At 210, a network device determines, according to an attribute of a QoS flow, a QoS rule used by a terminal device for transmitting an uplink data packet.

At 220, the network device sends indication information to the terminal device, wherein the indication information is used for indicating the QoS rule.

In at least one embodiment, the QoS rule includes a first QoS rule or a second QoS rule.

The first QoS rule is a rule that the terminal device determines, according to a QFI of a QoS flow including a downlink data packet, a mapping between application layer data and the QoS flow and transmits the uplink data packet based on the mapping, wherein the QFI is carried in the downlink data packet. The first QoS rule may also be referred to a Reflective QoS (R QoS) rule.

The second QoS rule is a rule that the terminal device transmits the uplink data packet based on the mapping configured by the network device. The second QoS rule may also be referred to a configured QoS rule.

The QoS rule may also be referred to a filtering rule. The filtering rule is used by the terminal device for filtering a data packet to be transmitted, thereby transmitting corresponding data via different QoS flows. The network device may determine, according to the attribute of the QoS flow, the QoS rule used by the terminal device for transmitting the uplink data packet, and indicate the QoS rule to the terminal device.

When the first QoS rule (i.e., the Reflective QoS rule) is used by the terminal device, the terminal device acquires data information in a sending direction according to data information in a receiving direction. For example, the network device may carry the QFI in all downlink data packets that belong to a same QoS flow. After the terminal device successfully acquires each downlink data packet, the terminal device may record information of the downlink data packet and a mapping between the information of the downlink data packet and the QoS flow. When an uplink data packet needs to be sent, the terminal device directly sends xe uplink data packet according to the recorded mapping.

When the second QoS rule (i.e., the configured QoS rule) is used by the terminal device, the network device may directly indicate a mapping between application layer data and QoS flows to the terminal device, so that the terminal device sends uplink data according to the mapping.

For example, data carrying a same Internet Protocol (IP) quintuple may correspond to one QoS flow, and each QoS flow is identified by a QFI. The terminal device transmits, according to an IP quintuple of an uplink data packet to be sent and a mapping between the IP quintuple of the application layer data and the QoS flows, the uplink data packet by using an appropriate QoS flow.

In the embodiments of the disclosure, two manners are provided to determine the QoS rule used by the terminal device, which will be described below respectively.

Manner 1

The attribute of the QoS flow include a value of the QFI.

In 210, the operation that the network device determines, according to the attribute of the QoS flow, the QoS rule used by the terminal device may include the following actions.

When the value of the QFI is less than or equal to K, the network device determines that the QoS rule is the first QoS rule.

When the value of the QFI is greater than K, the network device determines that the QoS rule is the second QoS rule.

Herein, $K=2^M-1$, M is the number of bits occupied by the QFI when the first QoS rule is used, and K and M both are a positive integer.

In this embodiment of the disclosure, the number of bits occupied by the QFI in the first QoS rule is M and the QFI may take up to $K=2^M-1$ values. When the value of the QFI does not exceed K, the network device may determine that the QoS rule is the first QoS rule. When the value of the QFI exceeds K, the network device may determine that the QoS rule is the second QoS rule.

In at least one embodiment, when the second QoS rule is used, the number of bits occupied by the QFI is greater than K.

Manner 2

The attribute of the QoS flow includes QoS information of the QoS flow.

The QoS information includes at least one of the following: a resource type of the QoS flow a priority level of the QoS flow, a packet delay budget of the QoS flow, a packet error rate of the QoS flow, an averaging window of the QoS flow or a maximum data burst volume of the QoS flow.

In at least one embodiment, when the QoS information includes the resource type of the QoS flow, in 210, the operation that the network device determines, according to the attribute of the QoS flow, the QoS rule used by the terminal device may include the following actions.

When the resource type of the QoS flow is a Guaranteed Bit Rate (GBR) type or a delay critical GBR type, the network device determines that the QoS rule is the first QoS rule.

When the resource type of the QoS flow is a non-GBR type, the network device determines that the QoS rule is the second QoS rule.

In this embodiment of the disclosure, a QoS rule to be used by the terminal device is determined by the network device according to the QoS information of the QoS flow such as the resource type. When the QoS flow is a GBR type or delay critical GBR type service, the first QoS rule is used. When the QoS flow is a non-GBR type service, the second QoS rule is used.

In at least one embodiment, after the operation in 220, the method may further include the following operation. The network device determines the number of bits occupied by the QFI according to the QoS rule.

For example, when the QoS rule is the first QoS rule, the network device determines that the number of bits occupied by the QFI is M, and when the QoS rule is the second QoS rule, the network device determines that the number of bits occupied by the QFI is N. Herein, M and N both are a positive integer, and M≠N.

Particularly, M=6, N=7.

The network device may be an access network device or a core network device. In at least one embodiment, when the network device is the access network device, the access network device may receive information of the attribute of the QoS flow sent by a core network device, other access network devices or the terminal device, so that the QoS rule to be used by the terminal device is determined according to the information of the attribute of the QoS flow.

FIG. 3 illustrates a schematic flowchart of a method 300 for transmitting data based on QoS according to an embodiment of the disclosure. The method illustrated in FIG. 3 may be executed by a network device. The network device may be, for example, the access network device 110 or the core network device 130 illustrated in FIG. 1. As illustrated in FIG. 3, the method 300 may include a part or all of the following contents.

At 310, a network device determines, according to a QoS rule used by a terminal device, the number of bits occupied by a QFI for identifying a QoS flow.

In at least one embodiment, the QoS rule includes a first QoS rule or a second QoS rule.

The first QoS rule is a rule that the terminal device determines, according to a QFI of a QoS flow including a downlink data packet, a mapping between application layer data and the QoS flow and transmits the uplink data packet based on the mapping, wherein the QFI is carried in the downlink data packet. The first QoS rule may also be referred to a Reflective QoS (R QoS) rule.

The second QoS rule is a rule that the terminal device transmits the uplink data packet based on the mapping configured by the network device. The second QoS rule may also be referred to a configured QoS rule.

The QoS rule may also be referred to a filtering rule. The filtering rule is used by the terminal device for filtering a data packet to be transmitted, thereby transmitting corresponding data via different QoS flows. The network device may determine, according to the attribute of the QoS flow, the QoS rule used by the terminal device for transmitting the uplink data packet, and indicate the QoS rule to the terminal device.

When the first QoS rule (i.e., the Reflective QoS rule) is used by the terminal device, the terminal device acquires data information in a sending direction according to data information in a receiving direction. For example, the network device may carry the QFI in all downlink data packets that belong to a same QoS flow. After the terminal device successfully acquires each downlink data packet, the terminal device may record information of the downlink data packet and a mapping between the information of the downlink data packet and the QoS flow. When an uplink data packet needs to be sent, the terminal device directly sends the uplink data packet according to the recorded mapping.

When the second QoS rule (i.e., the configured QoS rule) is used by the terminal device, the network device may directly indicate a mapping between application layer data and QoS flows to the terminal device, so that the terminal device sends uplink data according to the mapping.

For example, data carrying a same IP quintuple may correspond to one QoS flow, and each QoS flow is identified by a QFI. The terminal device transmits, according to an IP quintuple of an uplink data packet to be sent and a mapping between the IP quintuple of the application layer data and the QoS flows, the uplink data packet by using an appropriate QoS flow.

In at least one embodiment, in 310, the operation that the network device determines, according to the QoS rule used by the terminal device, the number of bits occupied by the QFI for identifying the QoS flow may include the following actions. When the QoS rule is the first QoS rule, the network device determines that the number of bits occupied by the QFI is M. When the QoS rule is the second QoS rule, the network device determines that the number of bits occupied by the QFI is N. Herein, M and N both are a positive integer, and M≠N.

Particularly, M=6, N=7.

Figure 4:
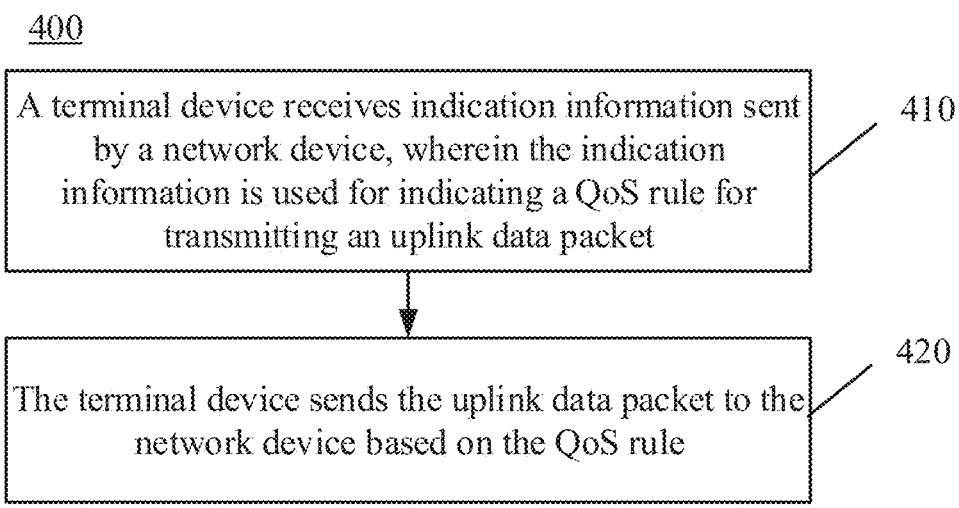
FIG. 4 illustrates a schematic flowchart of a method for transmitting data based on QoS according to an embodiment of the disclosure.

FIG. 4 illustrates a schematic flowchart of a method 400 for transmitting data based on QoS according to an embodiment of the disclosure. The method illustrated in FIG. 4 may be executed by a terminal device. The terminal device may be, for example, the terminal device 120 illustrated in FIG. 1. As illustrated in FIG. 4, the method 400 may include a part or all of the following contents.

At 410, a terminal device receives indication information sent by a network device, wherein the indication information is used for indicating a QoS rule for transmitting an uplink data packet.

At 420, the terminal device sends the uplink data packet to the network device based on the QoS rule.

In at least one embodiment, the QoS rule includes a first QoS rule or a second QoS rule.

The first QoS rule is a rule that the terminal device determines, according to a QFI of a QoS flow including a downlink data packet, a mapping between application layer data and the QoS flow and transmits the uplink data packet based on the mapping, wherein the QFI is carried in the downlink data packet. The first QoS rule may also be referred to a Reflective QoS (R QoS) rule.

The second QoS rule is a rule that the terminal device transmits the uplink data packet based on the mapping configured by the network device. The second QoS rule may also be referred to a configured QoS rule.

The QoS rule may also be referred to a filtering rule. The filtering rule is used by the terminal device for filtering a data packet to be transmitted, thereby transmitting corresponding data via different QoS flows. The network device may determine, according to the attribute of the QoS flow, the QoS rule used by the terminal device for transmitting the uplink data packet, and indicate the QoS rule to the terminal device.

When the first QoS rule (i.e., the Reflective QoS rule) is used by the terminal device, the terminal device acquires data information in a sending direction according to data information in a receiving direction. For example, the network device may carry the QFI in all downlink data packets that belong to a same QoS flow. After the terminal device successfully acquires each downlink data packet, the terminal device may record information of the downlink data packet and a mapping between the information of the downlink data packet and the QoS flow. When an uplink data packet needs to be sent, the terminal device directly sends the uplink data packet according to the recorded mapping.

When the second QoS rule (i.e., the configured QoS rule) is used by the terminal device, the network device may directly indicate a mapping between application layer data and QoS flows to the terminal device, so that the terminal device sends uplink data according to the mapping.

For example, data carrying a same IP quintuple may correspond to one QoS flow, and each QoS flow is identified by a QFI. The terminal device transmits, according to an IP quintuple of an uplink data packet to be sent and a mapping between the IP quintuple of the application layer data and the QoS flows, the uplink data packet by using an appropriate QoS flow.

In at least one embodiment, when the value of the QFI is less than or equal to K, the QoS rule is the first QoS rule, and when the value of the QFI is greater than K, the QoS rule is the second QoS rule. Herein, $K=2^M-1$, M is the number of bits occupied by the QFI when the first QoS rule is used, and K and M both are a positive integer.

In at least one embodiment, when a resource type of the QoS flow is a GBR type or a delay critical GRB type, the QoS rule is the first QoS, and when the resource type of the QoS flow is a non-GBR type, the QoS rule is the second QoS rule.

In at least one embodiment, when the QoS rule is the first QoS rule, the number of bits occupied by the QFI is M, and when the QoS rule is the second QoS rule, the number of bits occupied by the QFI is N. M and N both are a positive integer, and M≠N.

Particularly, M=6, N=7.

In at least one embodiment, the network device is an access network device or a core network device.

In at least one embodiment, when the network device is an access network device, the method may further include the following operation. The terminal device sends information of an attribute of the QoS flow to the access network device. The information of the attribute of the QoS flow is used by the network device to determine the QoS rule.

It should be understood that the specific details of the process for transmitting the data based on QoS by the terminal device may be referred to the above description on the network device in FIG. 2, and will not be elaborated for briefness.

It is to be understood that, in various embodiments of the disclosure, a magnitude of a sequence number of each process does not mean an execution sequence and the execution sequence of each process should be determined by its function and an internal logic, and should not form any limit to an implementation process of the embodiments of the disclosure.

The method for transmitting the data based on QoS according to the embodiments of the disclosure is described above in detail. Hereinafter, a device according to the embodiments of the disclosure will be described below in combination with FIG. 5 to FIG. 9. The technical features described in the method embodiments are applied to the following device embodiments.

Figure 5:
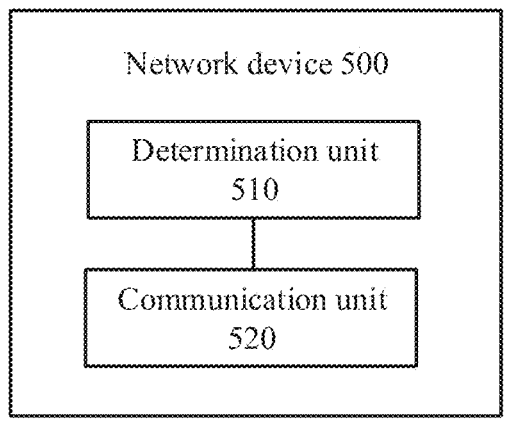
FIG. 5 illustrates a schematic block diagram of a network device according to an embodiment of the disclosure.

FIG. 5 illustrates a schematic block diagram of a network device 500 according to an embodiment of the disclosure. As illustrated in FIG. 5, the network device 500 may include a determination unit 510 and a communication unit 520.

The determination unit 510 is configured to determine, according to an attribute of a QoS flow, a QoS rule used by a terminal device for transmitting an uplink data packet.

The communication unit 520 is configured to send indication information to the terminal device. The indication information is used for indicating the QoS rule determined by the determination unit 510.

Therefore, the network device determines, according to the attribute of the QoS flow, the QoS rule used by the terminal device for transmitting the uplink data packet. The number of bits occupied by a QFI in different QoS rules is different, so that the terminal device can correctly acquire a QFI based on the used QoS rule, and acquire a mapping from application layer data to the QoS flow according to a QFI carried in a downlink data packet, thereby filtering and sending a data packet to be transmitted.

In at least one embodiment, the QoS rule includes a first QoS rule or a second QoS rule. The first QoS rule is a rule that the terminal device determines, according to a QFI of a QoS flow including a downlink data packet, a mapping between application layer data and the QoS flow and transmits the uplink data packet based on the mapping, wherein the QFI is carried in the downlink data packet. The second QoS rule is a rule that the terminal device transmits the uplink data packet based on the mapping configured by the network device.

In at least one embodiment, the attribute of the QoS flow include a value of the QFI.

In at least one embodiment, the determination unit 510 may specifically be configured to, responsive to determining that a value of the QFI is less than or equal to K, determine that the QoS rule is the first QoS rule, and responsive to determining that the value of the QFI is greater than K, determine that the QoS rule is the second QoS rule, where $K=2^M-1$, M is the number of bits occupied by the QFI when the first QoS rule is used. K and M both are a positive integer.

In at least one embodiment, the attribute of the QoS flow includes QoS information of the QoS flow. The QoS information includes at least one of the following: a resource type of the QoS flow a priority level of the QoS flow, a packet delay budget of the QoS flow, a packet error rate of the QoS flow, an averaging window of the QoS flow or a maximum data burst volume of the QoS flow.

In at least one embodiment, the QoS information includes the resource type of the QoS flow. The determination unit 510 may specifically be configured to: responsive to determining that the resource type of the QoS flow is a GBR type or a delay critical GBR type, determine that the QoS rule is the first QoS rule, and responsive to determining that the resource type of the QoS flow is a non-GBR type, determine that the QoS rule is the second QoS rule.

In at least one embodiment, the determination unit 510 may specifically be configured to: determine the number of bits occupied by the QFI according to the QoS rule.

In at least one embodiment, the determination unit 510 may specifically be configured to: responsive to determining that the QoS rule is the first QoS rule, determine that the number of bits occupied by the QFI is M, and responsive to determining that the QoS rule is the second QoS rule, determine that the number of bits occupied by the QFI is N, where M and N both are a positive integer, and M≠N.

In at least one embodiment, M=6, N=7.

In at least one embodiment, the network device is an access network device or a core network device.

In at least one embodiment, when the network device is the access network device, the communication unit 520 may further be configured to: receive information of the attribute of the QoS flow sent by a core network device, other access network devices or the terminal device.

It should be understood that the network device 500 may execute corresponding operations executed by the network device in the method 200, which will not be elaborated for briefness.

Figure 6:
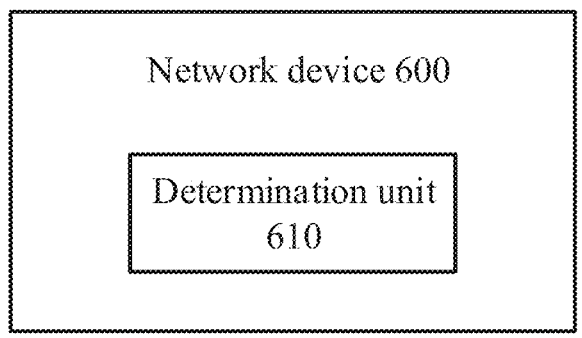
FIG. 6 illustrates a schematic block diagram of a network device according to an embodiment of the disclosure.

FIG. 6 illustrates a schematic block diagram of a network device 600 according to an embodiment of the disclosure. As illustrated in FIG. 6, the network device 600 may include a determination unit 610.

The determination unit is configured to determine, according to a QoS rule used by a terminal device, the number of bits occupied by a QFI for identifying a QoS flow.

Therefore, the network device determines, according to the QoS rule used by the terminal device, the number of bits occupied by the QFI. The number of bits occupied by a QFI in different QoS rules is different, so that the terminal device can correctly acquire a QFI based on the used QoS rule, and acquire a mapping from application layer data to the QoS flow according to a QFI carried in a downlink data packet, thereby filtering and sending a data packet to be transmitted.

In at least one embodiment, the QoS rule includes a first QoS rule or a second QoS rule. The first QoS rule is a rule that the terminal device determines, according to a QFI of a QoS flow including a downlink data packet, a mapping between application layer data and the QoS flow and transmits the uplink data packet based on the mapping, wherein the QFI is carried in the downlink data packet. The second QoS rule is a rule that the terminal device transmits the uplink data packet based on the mapping configured by the network device.

In at least one embodiment, the determination unit 610 may specifically be configured to: responsive to determining that the QoS rule is the first QoS rule, determine that the number of bits occupied by the QFI is M, and responsive to determining that the QoS rule is the second QoS rule, determine that the number of bits occupied by the QFI is N. M and N both are a positive integer, and M≠N.

In at least one embodiment, M=6, N=7.

It should be understood that the network device 600 may execute corresponding operations executed by the network device in the method 300, which will not be elaborated for briefness.

Figure 7:
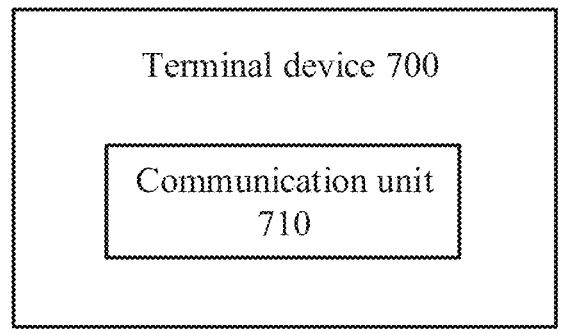
FIG. 7 illustrates a schematic block diagram of a terminal device according to an embodiment of the disclosure.

FIG. 7 illustrates a schematic block diagram of a terminal device 700 according to an embodiment of the disclosure. As illustrated in FIG. 7, the terminal device 700 may include a communication unit 710.

The communication unit is configured to receive indication information sent by a network device, where the indication information is used for indicating a QoS rule for transmitting an uplink data packet, and send the uplink data packet to the network device based on the QoS rule.

Therefore, the terminal device determines, according to the indication of the network device, the QoS rule used for transmitting the uplink data packet. The number of bits occupied by a QFI in different QoS rules is different, so that the terminal device can correctly acquire a QFI based on the used QoS rule, and acquire a mapping from application layer data to the QoS flow according to a QFI carried in a downlink data packet, thereby filtering and sending a data packet to be transmitted.

In at least one embodiment, the QoS rule includes a first QoS rule or a second QoS rule. The first QoS rule is a rule that the terminal device determines, according to a QFI of a QoS flow including a the downlink data packet, a mapping between application layer data and the QoS flow and transmits the uplink data packet based on the mapping, wherein the QFI is carried in the downlink data packet. The second QoS rule is a rule that the terminal device transmits the uplink data packet based on the mapping configured by the network device.

In at least one embodiment, when a value of the QFI is less than or equal to K, the QoS rule is the first QoS rule, and when the value of the QFI is greater than K, the QoS rule is the second QoS rule. $K=2^M-1$, M is the number of bits occupied by the QFI when the first QoS rule is used, and K and M both are a positive integer.

In at least one embodiment, when a resource type of the QoS flow is a GBR type or a delay critical GRB type, the QoS rule is the first QoS, and when the resource type of the QoS flow is a non-GBR type, the QoS rule is the second QoS rule.

In at least one embodiment, when the QoS rule is the first QoS rule, the number of bits occupied by the QFI is M, and when the QoS rule is the second QoS rule, the number of bits occupied by the QFI is N. M and N both are a positive integer, and M≠N.

In at least one embodiment, M=6, N=7.

In at least one embodiment, the network device is an access network device or a core network device.

In at least one embodiment, when the network device is an access network device, the communication unit 710 may further be configured to send information of an attribute of the QoS flow to the access network device. The information of the attribute of the QoS flow is used by the network device to determine the QoS rule.

It should be understood that the terminal device 700 may execute corresponding operations executed by the terminal device in the method 400, which will not be elaborated for briefness.

Figure 8:
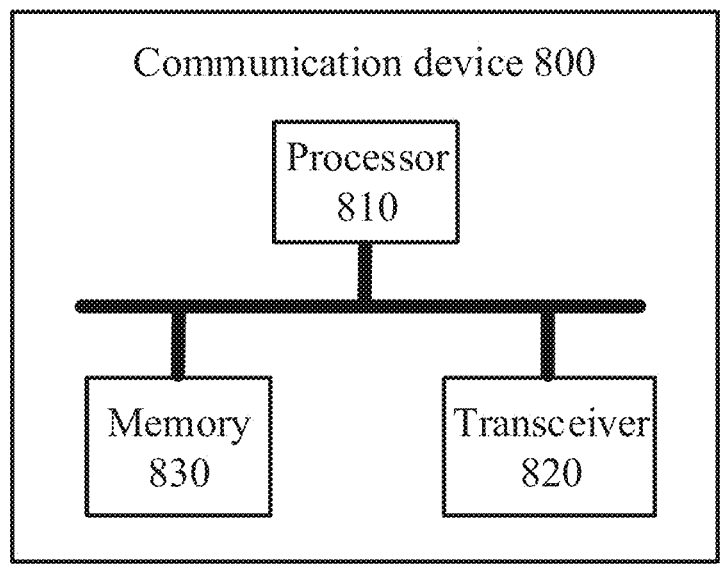
FIG. 8 illustrates a schematic structural diagram of a communication device according to an embodiment of the disclosure.

FIG. 8 illustrates a schematic structural diagram of a communication device 800 according to an embodiment of the disclosure. As illustrated in FIG. 8, the communication device may include a processor 810, a transceiver 820 and a memory 830. The processor 810, the transceiver 820 and the memory 830 communicate to each other via an internal connection path. The memory 830 is configured to store an instruction. The processor 810 is configured to execute the instruction stored in the memory 830 so as to control the transceiver 820 to receive a signal or send a signal.

In at least one embodiment, the processor 810 may invoke a program code stored in the memory 830 to execute corresponding operations executed by the network device in the method 200, which will not be elaborated herein for briefness.

In at least one embodiment, the processor 810 may invoke a program code stored in the memory 830 to execute corresponding operations executed by the network device in the method 300, which will not be elaborated herein for the briefness.

In at least one embodiment, the processor 810 may invoke a program code stored in the memory 830 to execute corresponding operations executed by the terminal device in the method 400, which will not be elaborated herein for the briefness.

It should be understood that in embodiments of the disclosure, the processor may be an integrated circuit chip and has a signal processing capability. During an implementation process, each operation in the above method embodiment may be completed via an integrated logic circuit of hardware in the processor or an instruction in a software form. The processor may be a universal processor, a Digital Signal Processor (DSP), an Application Specific Integrated Circuit (ASIC) and a Field Programmable Gate Array (FPGA) or other programmable logic devices, discrete gates or transistor logic devices, and discrete hardware component. Each method, operation and logic block diagram disclosed in the embodiments of the disclosure may be implemented or executed. The universal processor may be a microprocessor or the processor may also be any conventional processor and the like. The operations of the methods disclosed in combination the embodiments of the disclosure may be directly embodied to be executed and completed by a hardware processor or executed and completed by a combination of hardware and software modules in the processor. The software module may be located in a mature storage medium in the art, such as a Random Access Memory (RAM), a flash memory, a Read-Only Memory (ROM), a Programmable ROM (PROM), an Electrically EPROM (EEPROM) or a register. The storage medium is located in the memory. The processor reads information from the memory and completes the operations of the foregoing methods in combination with the hardware of the processor.

It may be understood that the memory in the embodiments of the disclosure may be a volatile memory or a non-volatile memory, or may include both of the volatile memory and the non-volatile memory. The volatile memory may be an ROM, a PROM, an EPROM, an EEPROM or a flash memory. The non-volatile memory may be a Random Access Memory (RAM) and used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR. SDRAM), an Enhanced SDRAM (ESDRAM), a Synchlink DRAM (SLDRAM) and a Direct Rambus RAM (DR RAM). It is important to note that a memory of the system and the method described in the disclosure is intended to include, but not limited to, memories of these and any other suitable types.

Figure 9:
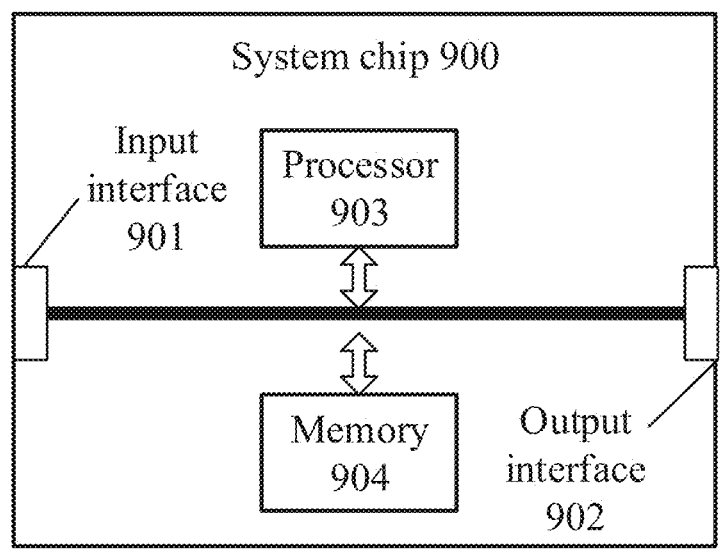
FIG. 9 illustrates a schematic structural diagram of a system chip according to an embodiment of the disclosure.

FIG. 9 illustrates a schematic structural diagram of a system chip according to an embodiment of the disclosure. The system chip 900 in FIG. 9 may include an input interface 901, an output interface 902, at least one processor 903, and a memory 904. The input interface 901, the output interface 902, the processor 903, and the memory 904 are connected to each other via an internal connection path. The processor 903 is configured to execute a code in the memory 904.

In at least one embodiment, when the code is executed, the processor 903 may implement corresponding operations executed by the network device in the method 200, which will not be elaborated herein for briefness.

In at least one embodiment, when the code is executed, the processor 903 may implement corresponding operations executed by the network device in the method 300, which will not be elaborated herein for briefness.

In at least one embodiment, when the code is executed, the processor 903 may implement corresponding operations executed by the terminal device in the method 400, which will not be elaborated herein for briefness.

Those of ordinary skill in the art may be realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a LI disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

What is claimed is:

1. A method for transmitting data based on Quality of Service (QoS), comprising:
    determining, by a network device according to an attribute of a QoS flow, a QoS rule used by a terminal device for transmitting an uplink data packet; and
    sending, by the network device, indication information to the terminal device, the indication information being configured for indicating the QoS rule,
    wherein the QoS rule comprises a first QoS rule or a second QoS rule;
    the first QoS rule is a rule that the terminal device determines, according to a QoS flow Identifier (QFI) of a QoS flow comprising a downlink data packet, a mapping between application layer data and the QoS flow and transmits the uplink data packet based on the mapping, the QFI being carried in the downlink data packet; and
    the second QoS rule is a rule that the terminal device transmits the uplink data packet based on the mapping configured by the network device; and
    wherein the attribute of the QoS flow comprises a value of the QFI, and determining, by the network device according to the attribute of the QoS flow, the QoS rule used by the terminal device comprises:
    responsive to determining that the value of the QFI is less than or equal to K, determining, by the network device, that the QoS rule is the first QoS rule; and
    responsive to determining that the value of the QFI is greater than K, determining, by the network device, that the QoS rule is the second QoS rule;
    wherein $K=2^M-1$, M is a number of bits occupied by the QFI when the first QoS rule is used, and K and M each is a positive integer.

2. The method of claim 1, further comprising:
    determining, by the network device according to the QoS rule, a number of bits occupied by the QFI.

3. The method of claim 2, wherein determining, by the network device according to the QoS rule, the number of bits occupied by the QFI comprises:
    responsive to determining that the QoS rule is the first QoS rule, determining, by the network device, that the number of bits occupied by the QFI is M; and
    responsive to determining that the QoS rule is the second QoS rule, determining, by the network device, that the number of bits occupied by the QFI is N;
    wherein M and N both are a positive integer, and M≠N.

4. A method for transmitting data based on Quality of Service (QoS), comprising:
    receiving, by a terminal device, indication information sent by a network device, the indication information being configured to indicate a QoS rule for transmitting an uplink data packet; and
    sending, by the terminal device, the uplink data packet to the network device based on the QoS rule,
    wherein the QoS rule comprises a first QoS rule or a second QoS rule;
    the first QoS rule is a rule that the terminal device determines, according to a QoS flow Identifier (QFI) of a QoS flow comprising a downlink data packet, a mapping between application layer data and the QoS flow and transmits the uplink data packet based on the mapping, the QFI being carried in the downlink data packet; and
    the second QoS rule is a rule that the terminal device transmits the uplink data packet based on the mapping configured by the network device; and
    wherein when a value of the QFI is less than or equal to K, the QoS rule is the first QoS rule, and when the value of the QFI is greater than K, the QoS rule is the second QoS rule; and
    wherein $K=2^M-1$, M is a number of bits occupied by the QFI when the first QoS rule is used, and K and M each is a positive integer.

5. The method of claim 4, wherein when a resource type of the QoS flow is a Guaranteed Bit Rate (GBR) type or a delay critical GRB type, the QoS rule is the first QoS, and when the resource type of the QoS flow is a non-GBR type, the QoS rule is the second QoS rule.

6. The method of claim 4, wherein when the QoS rule is the first QoS rule, the number of bits occupied by the QFI is M, and when the QoS rule is the second QoS rule, the number of bits occupied by the QFI is N; and
    wherein M and N both are a positive integer, and M≠N.

7. The method of claim 4, wherein the network device is an access network device or a core network device, and when the network device is the access network device, the method further comprises:
    sending, by the terminal device, information of an attribute of the QoS flow to the access network device, the information of the attribute of the QoS flow being used by the network device to determine the QoS rule.

8. A terminal device, comprising: a memory and a processor, the memory storing one or more computer programs that, when executed by the processor, cause the processor to execute operations comprising:
    receiving indication information sent by a network device, the indication information being configured to indicate a Quality of Service (QoS) rule for transmitting an uplink data packet; and
    sending the uplink data packet to the network device based on the QoS rule,
    wherein the QoS rule comprises a first QoS rule or a second QoS rule;
    the first QoS rule is a rule that the terminal device determines, according to a QoS Flow Identifier (QFI) of a QoS flow comprising a the downlink data packet, a mapping between application layer data and the QoS flow and transmits the uplink data packet based on the mapping, the QFI being carried in the downlink data packet; and
    the second QoS rule is a rule that the terminal device transmits the uplink data packet based on the mapping configured by the network device; and wherein when a value of the QFI is less than or equal to K, the QoS rule is the first QoS rule, and when the value of the QFI is greater than K, the QoS rule is the second QoS rule; and wherein $K=2^M-1$, M is a number of bits occupied by the QFI when the first QoS rule is used, and K and M each is a positive integer.

9. The terminal device of claim 8, wherein when a resource type of the QoS flow is a Guaranteed Bit Rate (GBR) type or a delay critical GRB type, the QoS rule is the first QoS, and when the resource type of the QoS flow is a non-GBR type, the QoS rule is the second QoS rule.

10. The terminal device of claim 8, wherein when the QoS rule is the first QoS rule, the number of bits occupied by the QFI is M, and when the QoS rule is the second QoS rule, the number of bits occupied by the QFI is N; and wherein M and N both are a positive integer, and M≠N.

11. The terminal device of claim 8, wherein the network device is an access network device or a core network device, and when the network device is the access network device, the operations further comprise:

sending information of an attribute of the QoS flow to the access network device, the information of the attribute of the QoS flow being used by the network device to determine the QoS rule.

* * * * *